INVENTORS
RAYMOND H. HOSKINS
BERNARD H. SOFFER

Elliott & Pastoriza
ATTORNEYS

United States Patent Office 3,427,566
Patented Feb. 11, 1969

3,427,566
SOLID STATE LASER DEVICE USING GADOLINIUM OXIDE AS THE HOST MATERIAL
Raymond H. Hoskins, San Pedro, and Bernard H. Soffer, Northridge, Calif., assignors to Union Carbide Corporation
Filed Mar. 2, 1964, Ser. No. 348,612
U.S. Cl. 331—94.5                               10 Claims
Int. Cl. H01s 3/00, 3/16; C09k 1/04

ABSTRACT OF THE DISCLOSURE

A solid state laser device including a host crystal of gadolinium oxide doped with from .01 to 10 atom percent of neodymium to provide the lasering ions is provided.

---

This invention relates generally to laser devices and more particularly to an improved solid state laser device using gadolinium oxide as the host crystal.

Solid state materials for effecting light amplification by the stimulated emission of radiation, from which the term "laser" is derived, are now well known in the art. These devices include a host crystal doped with a primary additive to provide the laser ions. The stimulated emission of radiation is effected by pumping optical energy into the crystal to provide an inverted population between two energy levels of the laser ions. Regenerative means in the form of end coatings of high reflectance or alternatively end mirrors or semi-transparent surfaces adjacent the opposite ends of the crystal, are provided to stimulate the coherent emission of monochromatic light of a wave length and frequency corresponding to the energy difference between the predetermined energy levels. The emitted light may be coupled out of the system through a small opening in one of the end reflectors or through one of the end reflectors when only a partially reflecting surface is provided.

Many of the solid state host materials in which laser action has been realized require complicated, delicate, and expensive auxiliary equipment. For example, the energy levels of the laser ion and fluorescent lifetime of the device may be such that extremely stringent requirements are placed on the optical pumping system in order to realize useful laser action. Thus, peak power loads on the optical pumping system to effect the desired population inversion are often of such magnitude as to "burn out" the pumping light source relatively quickly. In other instances, cooling systems of an elaborate nature are required.

In addition to the foregoing, the physical properties of the crystal host material itself may be undesirable. For example, the crystal may be soft, difficult to fabricate, have a low melting point, and be vulnerable to chemical action. Also, a solid state host crystal may lack the optical transparency or clarity over a broad spectral band required to effect efficient laser action and particularly, to provide a narrow beam.

Finally, many solid state crystal host materials require charge compensation necessitating the use of a secondary additive in the powder during the crystal growing operation. Such charge compensation procedures often lead to a tendency for the laser material to color or darken under optical pump illumination, thereby detrimentally affecting, or even preventing laser action.

With the above in mind, it is accordingly a primary object of this invention to provide a new solid state laser device in which many of the foregoing problems are overcome.

More particularly, it is an object to provide a new solid state laser device which does not place stringent requirements on the optical pumping system used with the device.

Other objects are to provide a solid state laser device including a host crystal which is hard, rugged, has a high melting point, is chemically inert, and which is amenable to relatively easy fabrication.

Still another object is to provide a solid state laser host crystal of extremely high optical transparency or clarity over a broad spectral band to the end that an efficient laser operation is provided.

Another object is to synthesize a solid state laser host crystal of superior crystal quality to thereby provide a narrow laser beam angle.

A particularly important object is to provide a new solid state laser in which the isomorphic substitution of the laser ion in the crystal lattice of the host crystal can be effected without charge compensation and its resulting problems.

Another object is to provide a new solid state laser for emitting output radiation of frequencies different from frequencies generated in solid state lasers heretofore available.

Briefly, these and other objects and advantages of this invention are attained by providing a host crystal of gadolinium oxide containing neodymium ions as the primary additive. The physical properties of the gadolinium oxide crystal, such as stability under intense illumination, hardness, high melting point, chemical inertness, and optical transparency over a broad spectral band, enable the various objects to be realized.

A better understanding of the new laser device of this invention will now be had by referring to a detailed description of one embodiment thereof in conjunction with the accompanying drawings, in which.

Figure 1:
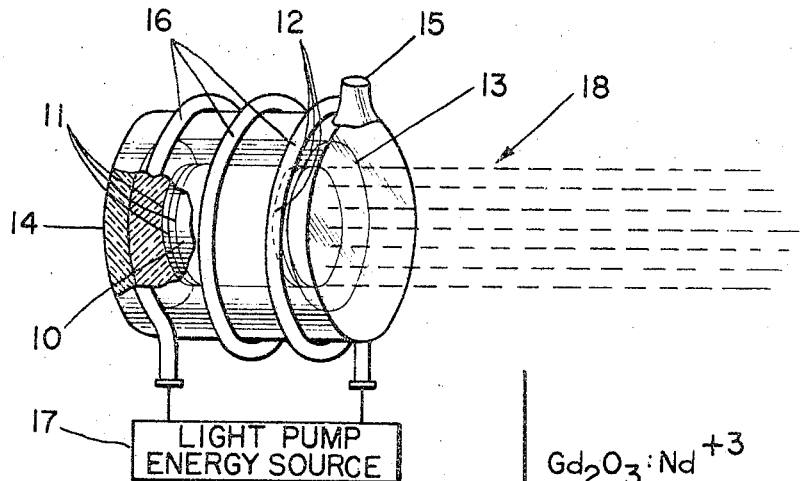
FIGURE 1 is a schematic perspective view of the basic components making up the laser device of this invention.

Referring first to FIGURE 1, the laser crystal is shown at 10 and in accordance with this invention comprises gadolinium oxide ($Gd_2O_3$), containing neodymium ions ($Nd^{+3}$) as the primary additive. Opposite end surfaces of the host crystal are carefully ground to exact parallel relationship and are provided with regeneration means in the form of dielectric coatings 11 and 12. The dielectric coatings may consist of alternate layers of magnesium fluoride and cerium oxide of quarter wave length thicknesses at a center frequency corresponding to approximately 1.08 microns. The multilayer dielectric coatings are such as to provide high reflectance between wave lengths of 1.06 to 1.09 microns. However, it should be understood that these coatings may be designed to provide high reflectance characteristics over different wave length ranges depending upon the particular fluorescent intensity peaks characteristic of gadolinium oxide host and added neodymium ions at which it is desired to effect laser action.

In the particular example illustrated in FIGURE 1, the laser crystal 10 with the end coatings 11 and 12 is sealed within a Pyrex transparent tube 13 in turn surrounded by a Dewar vessel 14 for providing cooling. Towards this end, liquid nitrogen may be introduced at 15 to hold the crystal at a temperature of substantially 77° K. Optical pumping means is provided in the form of a spiral flash lamp 16 surrounding the Dewar vessel 14 and connected to a suitable energy source 17. The stimulated laser beam passes through the coatings 12 as indicated at 18.

In the embodiment of the laser device illustrated in FIGURE 1, the host crystal of gadolinium oxide was grown by the flame fusion method with the neodymium added in the proportion of 4 atom percent of $Nd^{+3}$. In other words, for every 4 atoms of neodymium there are 100 atoms of gadolinium. However, it is possible to vary the atom percent of the neodymium ion from $1/100$ atom percent to 10 atom percent.

The grown crystal was then fabricated into a generally cylindrical shape with flat parallel ends for coating with the dielectric multilayer coatings 11 and 12 as described.

Figure 2:
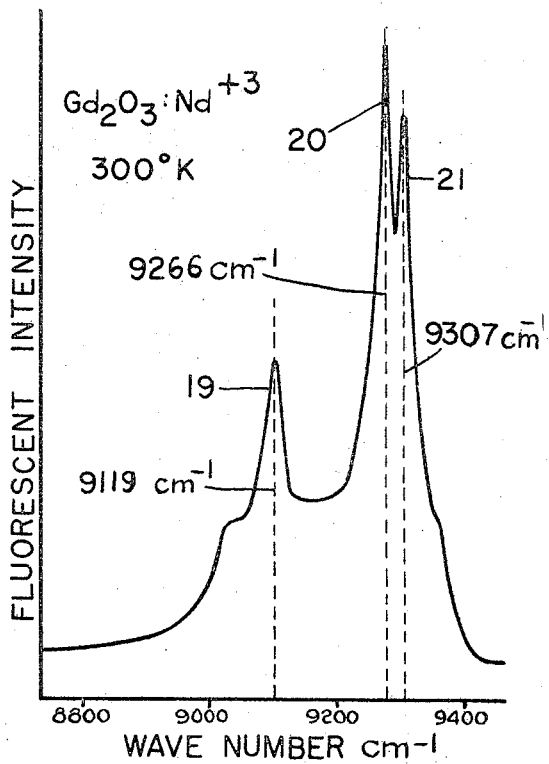
FIGURE 2 illustrates the fluorescent intensity characteristics of the device as a function of wave number over a given spectral band at approximately room temperature; and, FIGURE 3 illustrates the fluorescent characteristics over the same spectral band at a temperature of 77° K.

Referring to FIGURE 2, the fluorescent characteristics of the $Gd_2O_3:Nd^{+3}$ at room temperature or approximately 300° K. are shown. The abscissas in FIGURE 2 are expressed in wave numbers which constitute the reciprocals of the wave lengths in inverse centimeters. Therefore, the abscissas are directly proportional to the frequencies of radiation resulting from fluorescence in the crystalline structure.

In FIGURE 2 it will be noted that fluorescent peaks 19, 20 and 21 occur at wave numbers of approximately 9119, 9266 and 9307.

Figure 3:
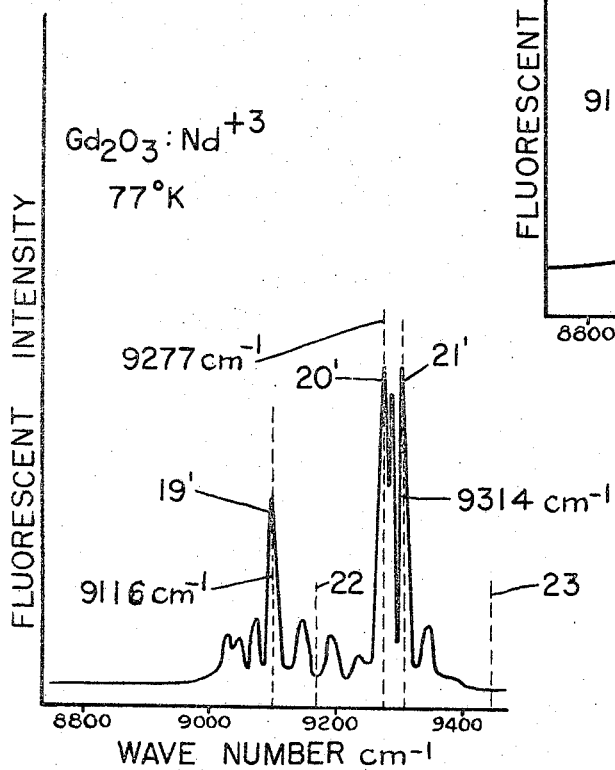

FIGURE 3 shows the fluorescent intensity characteristics of the laser crystal when cooled to a temperature of 77° K. The fluorescent peaks corresponding to 19, 20 and 21 of FIGURE 2 are indicated at 19', 20' and 21' in FIGURE 3. As a consequence of the cooling, the heights of the peaks increased considerably and the width decreased to approximately one-fourth. The wave numbers at which peaks occurred varied only a small amount. The ordinate scale in FIGURE 3 is different from that in FIGURE 2 in order to accommodate the peaks on the drawing.

In FIGURE 3 the spectral band at which high reflectance is provided by the multilayer dielectric coatings 11 and 12 referred to in FIGURE 1 is defined by the vertical dash lines 22 and 23. This high reflectance thus occurs in a band including the maximum intensity peaks 20' and 21' and it is at these peaks that laser action is observed. If the multidielectric reflective end coatings were designed to encompass the fluorescent peaks 19' illustrated in FIGURE 3, laser action would undoubtedly be observed at this frequency.

In the operation of the device of FIGURE 1, stimulated emission was observed at both room temperature and 77° K. at wave lengths near 1.079 and 1.074 microns. Beam angles of $4 \times 10^{-3}$ radians and less as recorded on a photographic plate were observed, which is only two times the theoretical diffraction limit. This relatively narrow beam angle is a consequence of the high quality crystal structure synthesized.

The neodymium ions in the gadolinium oxide host crystal have a four level energy characteristic. The terminal energy level contains relatively few of the neodymium ions or stated differently, is of a relatively low population. The fluorescent lifetime of the major peaks depicted in FIGURE 3 on the other hand, provides sufficient time to pump ions into higher energy levels to effect a population inversion without requiring too large a peak power from the spiral flash lamp.

The excellent transparent characteristics of the gadolinium oxide crystal over a broad spectral band leads to efficient laser operation. Further, the $Gd_2O_3$ crystal lattice is such that isomorphic substitution of tri-valent rare earth ions such as the $Nd^{+3}$ can be effected without the complications of charge compensation.

Finally, it will be evident from FIGURE 3 that emitted radiation frequencies corresponding to the lines at 20' and 21' are different from frequencies heretofore emitted by solid state lasers.

From the foregoing description, it will be evident that the present invention has provided a new solid state laser device having distinct features and advantages over solid state laser devices fabricated heretofore. While only one particular set-up of the laser device has been shown and described in the accompanying drawings, the laser characteristics of the gadolinium oxide host crystal containing neodymium ions is not to be thought of as limited to the particular values set forth.

What is claimed is:

1. A solid state laser device in which the active medium is a host material constituting a single crystal of $Gd_2O_3$.

2. A solid state laser device in which the active medium is a host material constituting a single crystal of $Gd_2O_3$ and a primary additive of $Nd^{+3}$ as the active ion.

3. A laser device according to claim 2, in which the atom percent of $Nd^{+3}$ is from .01 to 10 percent.

4. A laser device according to claim 3, in which the atom percent of $Nd^{+3}$ is substantially 4 percent.

5. A solid state laser device comprising: a host material constituting a single crystal of $Gd_2O_3$ containing from .01 to 10 atom percent of $Nd^{+3}$ ions at given energy levels; regeneration means exhibiting high reflectance at given wave lengths optically coupled to opposite end portions of said crystal; and optical pumping means coupled to said crystal for effecting an inverted population state of said $Nd^{+3}$ ions between certain ones of said given energy levels whereby stimulated radiation is emitted from said crystal at frequencies corresponding to the energy difference between said certain ones of said given energy levels.

6. A device according to claim 5, including temperature control means for holding the temperatures of said crystal at a given value below the ambient temperature.

7. A device according to claim 5, in which said crystal has end faces, said regeneration means comprising multilayer dielectric coatings on said end faces providing high reflectance at wave lengths corresponding to said frequencies at which stimulated radiation is emitted.

8. A device according to claim 5, in which said host crystal exhibits fluorescent peaks at wave lengths of substantially 1.074 and 1.079 microns, and in which said given energy levels are at least four in number, there being a relatively small $Nd^{+3}$ ion population in the fluorescence terminal level compared to said atom percent so that the peak power and total energy of pumping to effect an inverted population level between higher energy levels and said fluorescent terminal level is effectively decreased as a consequence of said energy level states.

9. A device according to claim 5, in which said crystal has flat parallel end faces, said regeneration means comprising multilayer dielectric coatings providing high reflectance at wave lengths between 1.06 and 1.09 microns, said frequencies of emitted radiation including frequencies corresponding to wave lengths of 1.074 microns and 1.079 microns.

10. A composition of matter consisting essentially of a gadolinium oxide crystal doped with neodymium ions.

References Cited

UNITED STATES PATENTS

| | | | |
|---|---|---|---|
| 3,250,722 | 5/1966 | Borchardt | 252—301.4 |
| 3,257,327 | 6/1966 | Nassau | 331—94.5 |
| 3,270,290 | 8/1966 | Maurer | 331—94.5 |
| 3,152,085 | 10/1964 | Ballman et al. | 331—94.5 |
| 3,289,100 | 11/1966 | Ballman et al. | 331—94.5 |

JEWELL H. PEDERSEN, *Primary Examiner.*

E. BAUER, *Assistant Examiner.*

U.S. Cl. X.R.

252—301.4